United States Patent
Hottovy et al.

(10) Patent No.: US 6,239,235 B1
(45) Date of Patent: May 29, 2001

(54) HIGH SOLIDS SLURRY POLYMERIZATION

(75) Inventors: John D. Hottovy; Harvey D. Hensley, both of Bartlesville, OK (US); David J. Przelomski, Houston, TX (US); Teddy H. Cymbaluk, Pasadena, TX (US); Robert K. Franklin, III, Houston, TX (US); Ethelwoldo P. Perez, Sugar Land, TX (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

(21) Appl. No.: 08/893,200

(22) Filed: Jul. 15, 1997

(51) Int. Cl.$^7$ ....................................................... C08F 2/06
(52) U.S. Cl. ............................ 526/64; 526/104; 526/348
(58) Field of Search ................................. 526/64, 348, 104

(56) References Cited

U.S. PATENT DOCUMENTS

| | | | |
|---|---|---|---|
| 3,152,872 | 10/1964 | Scoggin et al. | 34/15 |
| 3,172,737 | 3/1965 | Whittington | 23/285 |
| 3,242,150 | 3/1966 | Scoggin | 260/88.2 |
| 3,248,179 | 4/1966 | Norwood | 23/285 |
| 3,262,922 | 7/1966 | Payne | 260/93.7 |
| 3,318,857 | 5/1967 | Dietz | 260/93.7 |
| 3,418,305 | 12/1968 | Payne et al. | 260/94.9 |
| 3,816,383 | 6/1974 | Stotko | 260/94.9 F |
| 4,007,321 | 2/1977 | Scholz et al. | 526/64 |
| 4,099,335 | 7/1978 | Jezl et al. | 34/9 |
| 4,121,029 | 10/1978 | Irvin et al. | 526/64 |
| 4,395,523 | * 7/1983 | Kirch | 526/64 |
| 4,424,341 | 1/1984 | Hanson et al. | 528/501 |
| 4,501,885 | 2/1985 | Sherk et al. | 528/501 |
| 4,613,484 | 9/1986 | Ayres et al. | 422/132 |
| 4,737,280 | 4/1988 | Hanson | 210/181 |
| 4,794,151 | 12/1988 | Mueller-Mall et al. | 526/64 |
| 4,832,915 | 5/1989 | Messura et al. | 422/62 |
| 5,183,866 | 2/1993 | Hottovy | 526/88 |
| 5,455,314 | 10/1995 | Burns et al. | 526/61 |
| 5,565,174 | 10/1996 | Burns et al. | 422/131 |
| 5,575,979 | * 11/1994 | Hanson | 422/132 |
| 5,597,892 | 1/1997 | Hanson | 528/501 |
| 5,638,834 | * 6/1997 | Debras et al. | 526/64 |

* cited by examiner

Primary Examiner—David W. Wu
Assistant Examiner—Caixia Lu
(74) Attorney, Agent, or Firm—Polly C. Owen (57) ABSTRACT

An olefin polymerization process wherein monomer, diluent and catalyst are circulated in a continuous loop reactor and product slurry is recovered by means of a continuous product take off. The continuous product allows operating the reaction at significantly higher solids content in the circulating slurry. In a preferred embodiment, the slurry is heated in a flash line heater and passed to a high pressure flash where a majority of the diluent is separated and thereafter condensed by simple heat exchange, without compression, and thereafter recycled. Also an olefin polymerization process operating at higher reactor solids by virtue of more aggressive circulation.

25 Claims, 5 Drawing Sheets

*FIG. 10*

HIGH SOLIDS SLURRY POLYMERIZATION

BACKGROUND OF THE INVENTION

This invention relates to the polymerization of olefin monomers in a liquid diluent.

Addition polymerizations are frequently carried out in a liquid which is a solvent for the resulting polymer. When high density (linear) ethylene polymers first became commercially available in the 1950's this was the method used. It was soon discovered that a more efficient way to produce such polymers was to carry out the polymerization under slurry conditions. More specifically, the polymerization technique of choice became continuous slurry polymerization in a pipe loop reactor with the product being taken off by means of settling legs which operated on a batch principle to recover product. This technique has enjoyed international success with billions of pounds of ethylene polymers being so produced annually. With this success has come the desirability of building a smaller number of large reactors as opposed to a larger number of small reactors for a given plant capacity.

Settling legs, however, do present two problems. First, they represent the imposition of a "batch" technique onto a basic continuous process. Each time a settling leg reaches the stage where it "dumps" or "fires" accumulated polymer slurry it causes an interference with the flow of slurry in the loop reactor upstream and the recovery system downstream. Also the valve mechanism essential to periodically seal off the settling legs from the reactor upstream and the recovery system downstream requires frequent maintenance due to the difficulty in maintaining a tight seal with the large diameter valves needed for sealing the legs.

Secondly, as reactors have gotten larger, logistic problems are presented by the settling legs. If a pipe diameter is doubled the volume of the reactor goes up four-fold. However, because of the valve mechanisms involved, the size of the settling legs cannot easily be increased further. Hence the number of legs required begins to exceed the physical space available.

In spite of these limitations, settling legs have continued to be employed where olefin polymers are formed as a slurry in a liquid diluent. This is because, unlike bulk slurry polymerizations (i.e. where the monomer is the diluent) where solids concentrations of better than 60 percent are routinely obtained, olefin polymer slurries in a diluent are generally limited to no more than 37 to 40 weight percent solids. Hence settling legs have been believed to be necessary to give a final slurry product at the exit to the settling legs of greater than 37–40 percent. This is because, as the name implies, settling occurs in the legs to thus increase the solids concentration of the slurry finally recovered as product slurry.

Another factor affecting maximum practical reactor solids is circulation velocity, with a higher velocity for a given reactor diameter allowing for higher solids since a limiting factor in the operation is reactor fouling due to polymer build up in the reactor.

SUMMARY OF THE INVENTION

It is an object of this invention to produce olefin polymers as a slurry in a liquid diluent utilizing continuous product slurry takeoff;

It is a further object of this invention to operate a slurry olefin polymerization process in a diluent at a reactor solids concentration high enough to make direct continuous product takeoff commercially viable;

It is a further object of this invention to operate a slurry olefin polymerization process in a diluent at higher circulation velocities.

It is yet a further object of this invention to operate a slurry olefin polymerization process in a diluent in a reaction zone of greater than 30,000 gallons; and It is still yet a further object of this invention to provide a loop reactor apparatus having a capacity of greater than 30,000 gallons and having a continuous take off means.

In accordance with one aspect of this invention, an olefin polymerization process is carried out at a higher reactor solids concentration by means of continuous withdrawal of product slurry.

In accordance with another aspect of this invention, a loop reactor olefin polymerization process is carried out by operating at a higher circulation velocity for a given reactor pipe diameter.

In accordance with another aspect of this invention, a loop polymerization apparatus is provided having an elongated hollow appendage at a downstream end of one of the longitudinal segments of the loop, the hollow appendage being in direct fluid communication with a heated flash line and thus being adapted for continuous removal of product slurry.

BRIEF DESCRIPTION OF THE DRAWINGS

In the drawings, forming a part hereof.

DETAILED DESCRIPTION OF THE INVENTION

Surprisingly, it has been found that continuous take off of product slurry in an olefin polymerization reaction carried out in a loop reactor in the presence of an inert diluent allows operation of the reactor at a much higher solids concentration. Commercial production of predominantly ethylene polymers in isobutane diluent has generally been limited to a maximum solids concentration in the reactor of 37–40 weight percent. However, the continuous take off has been found to allow significant increases in solids concentration. Furthermore, the continuous take off itself brings about some additional increase in solids content as compared with the content in the reactor from which it takes off product because of the placement of the continuous take off appendage which selectively removes a slurry from a stratum where the solids are more concentrated. Hence concentrations of greater than 40 weight percent are possible in accordance with this invention.

Throughout this application, the weight of catalyst is disregarded since the productivity, particularly with chromium oxide on silica, is extremely high.

Also surprisingly, it has been found that more aggressive circulation (with its attendant higher solids concentration) can be employed. Indeed more aggressive circulation in combination with the continuous take off, solids concentrations of greater than 50 weight percent can be removed from the reactor by the continuous take off. For instance, the continuous take off can easily allow operating at 5–6 percentage points higher; i.e., the reactor can be adjusted to easily raise solids by 10 percent; and the more aggressive circulation can easily add another 7–9 percentage points which puts the reactor above 50 percent. But, because the continuous take off is positioned to take off slurry from a stratum in the stream which has a higher than average concentration of solids, the product actually recovered has about 3 percentage points(or greater) higher concentration than the reactor slurry average. Thus the operation can approach an effective slurry concentration of 55 weight percent or more, i.e. 52 percent average in the reactor and the removal of a component which is actually 55 percent (i.e. 3 percentage points) higher.

It must be emphasized that in a commercial operation as little as a one percentage point increase in solids concentration is of major significance. Therefore going from 37–40 average percent solids concentration in the reactor to even 41 is important; thus going to greater than 50 is truly remarkable.

The present invention is applicable to any olefin polymerization in a loop reactor utilizing a diluent so as to produce a product slurry of polymer and diluent. Suitable olefin monomers are 1-olefins having up to 8 carbon atoms per molecule and no branching nearer the double bond than the 4-position. The invention is particularly suitable for the homopolymerization of ethylene and the copolymerization of ethylene and a higher 1 -olefin such as butene, 1-pentene, 1-hexene, 1-octene or 1-decene. Especially preferred is ethylene and 0.01 to 10, preferably 0.01 to 5, most preferably 0.1 to 4 weight percent higher olefin based on the total weight of ethylene and comonomer. Alternatively sufficient comonomer can be used to give the above-described amounts of comonomer incorporation in the polymer.

Suitable diluents (as opposed to solvents or monomers) are well known in the art and include hydrocarbons which are inert and liquid under reaction conditions. Suitable hydrocarbons include isobutane, propane, n-pentane, i-pentane, neopentane and n-hexane, with isobutane being especially preferred.

Suitable catalysts are well known in the art. Particularly suitable is chromium oxide on a support such as silica as broadly disclosed, for instance, in Hogan and Banks, U.S. Pat. No. 2,285,721 (March 1958), the disclosure of which is hereby incorporated by reference.

Figure 1:
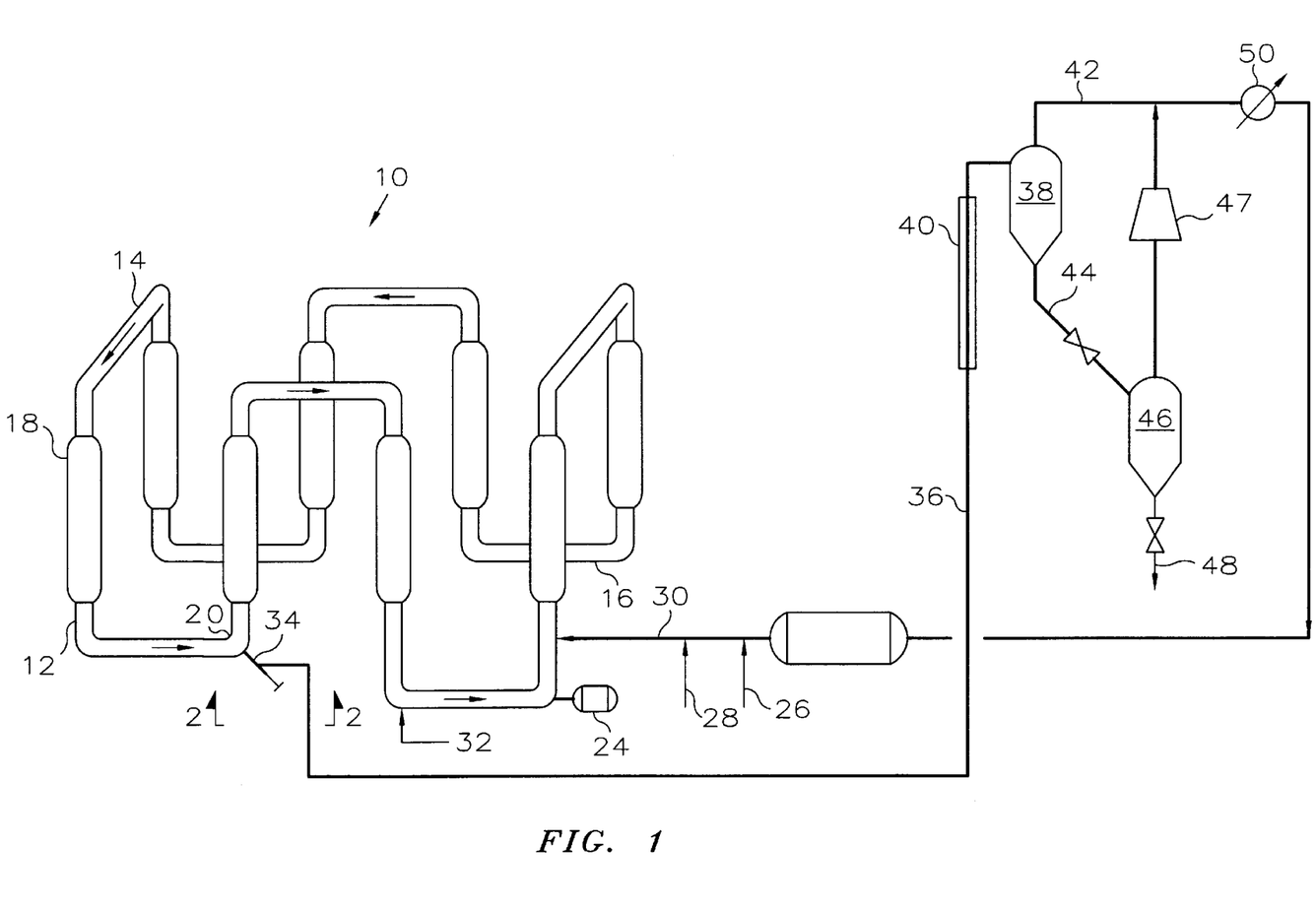
FIG. 1 is a schematic perspective view of a loop reactor and polymer recovery system.

Referring now to the drawings, there is shown in FIG. 1 a loop reactor 10 having vertical segments 12, upper horizontal segments 14 and lower horizontal segments 16. These upper and lower horizontal segments define upper and lower zones of horizontal flow. The reactor is cooled by means of two pipe heat exchangers formed by pipe 12 and jacket 18. Each segment is connected to the next segment by a smooth bend or elbow 20 thus providing a continuous flow path substantially free from internal obstructions. The polymerization mixture is circulated by means of impeller 22 (shown in FIG. 8) driven by motor 24. Monomer, comonomer, if any, and make up diluent are introduced via lines 26 and 28 respectively which can enter the reactor directly at one or a plurality of locations or can combine with condensed diluent recycle line 30 as shown. Catalyst is introduced via catalyst introduction means 32 which provides a zone (location) for catalyst introduction. The elongated hollow appendage for continuously taking off an intermediate product slurry is designated broadly by reference character 34. Continuous take off mechanism 34 is located in or adjacent to a downstream end of one of the lower horizontal reactor loop sections 16 and adjacent or on a connecting elbow 20.

The continuous take off appendage is shown at the downstream end of a lower horizontal segment of the loop reactor which is the preferred location. The location can be in an area near the last point in the loop where flow turns upward before the catalyst introduction point so as to allow fresh catalyst the maximum possible time in the reactor before it first passes a take off point. However, the continuous take off appendage can be located on any segment or any elbow.

Also, the segment of the reactor to which the continuous take off appendage is attached can be of larger diameter to slow down the flow and hence further allow stratification of the flow so that the product coming off can have an even greater concentration of solids.

The continuously withdrawn intermediate product slurry is passed via conduit 36 into a high pressure flash chamber 38. Conduit 36 includes a surrounding conduit 40 which is provided with a heated fluid which provides indirect heating to the slurry material in flash line conduit 36. Vaporized diluent exits the flash chamber 38 via conduit 42 for further processing which includes condensation by simple heat exchange using recycle condenser 50, and return to the system, without the necessity for compression, via recycle diluent line 30. Recycle condenser 50 can utilized any suitable heat exchange fluid known in the art under any conditions known in the art. However preferably a fluid at a temperature that can be economically provided is used. A suitable temperature range for this fluid is 40 degrees F to 130 degrees F. Polymer particles are withdrawn from high pressure flash chamber 38 via line 44 for further processing using techniques known in the art. Preferably they are passed to low pressure flash chamber 46 and thereafter recovered as polymer product via line 48. Separated diluent passes through compressor 47 to line 42. This high pressure flash design is broadly disclosed in Hanson and Sherk, U.S. Pat. No. 4,424,341 (Jan. 3, 1984), the disclosure of which is hereby incorporated by reference. Surprisingly, it has been found that the continuous take off not only allows for higher solids concentration upstream in the reactor, but also allows better operation of the high pressure flash, thus allowing the majority of the withdrawn diluent to be flashed off and recycled with no compression. Indeed, 70 to 90 percent of the diluent can generally be recovered in this manner. This is because of several factors. First of all, because the flow is continuous instead of intermittent, the flash line heaters work better. Also, the pressure drop after the proportional control valve that regulates the rate of continuous flow out of the reactor has a lower pressure which means when it flashes it drops the temperature lower thus further giving more efficient use of the flash line heaters.

Figures 2, 3:
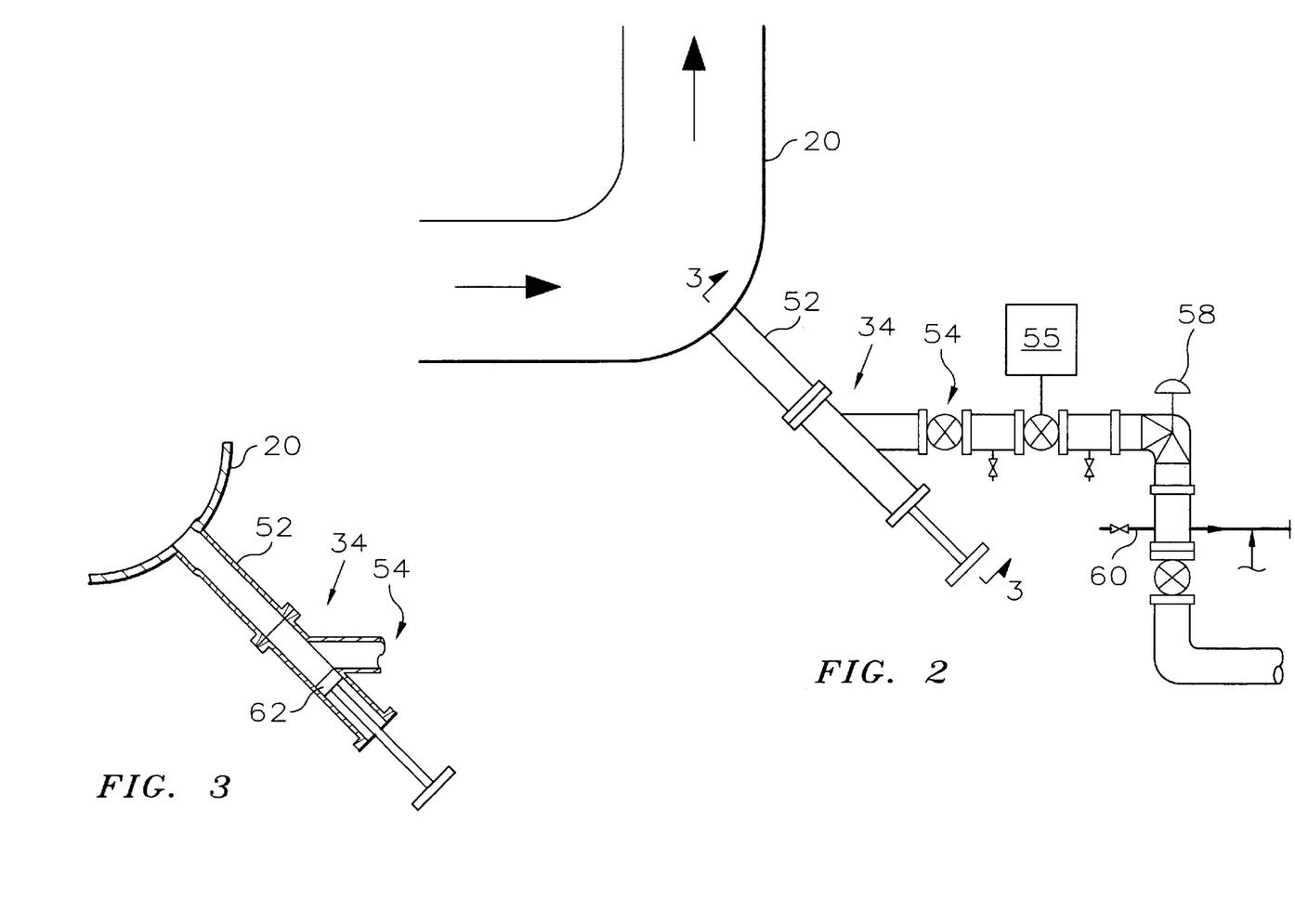
FIG. 2 is cross section along line 2—2 of FIG. 1 showing a continuous take off appendage.
FIG. 3 is a cross section along line 3—3 of FIG. 2 showing a ram valve arrangement in the continuous take off assembly.

Referring now to FIG. 2, there is shown elbow 20 with continuous take off mechanism 34 in greater detail. The continuous take off mechanism comprises a take off cylinder 52, a slurry withdrawal line 54, an emergency shut off valve 55, a proportional motor valve 58 to regulate flow and a flush line 60. The reactor is run "liquid" full. Because of dissolved monomer the liquid has slight compressibility, thus allowing pressure control of the liquid full system with a valve. Diluent input is generally held constant, the proportional motor valve 58 being used to control the rate of continuous withdrawal to maintain the total reactor pressure within designated set points.

Referring now to FIG. 3, which is taken along section line 3—3 of FIG. 2, there is shown the smooth curve or elbow 20 having associated therewith the continuous take off mechanism 34 in greater detail, the elbow 20 thus being an appendage-carrying elbow. As shown, the mechanism comprises a take off cylinder 52 attached, in this instance, at a right angle to a tangent to the outer surface of the elbow. Coming off cylinder 52 is slurry withdrawal line 54. Disposed within the take off cylinder 52 is a ram valve 62 which serves two purposes. First it provides a simple and reliable clean-out mechanism for the take off cylinder if it should ever become fouled with polymer. Second, it can serve as a simple and reliable shut-off valve for the entire continuous take off assembly.

Figure 4:
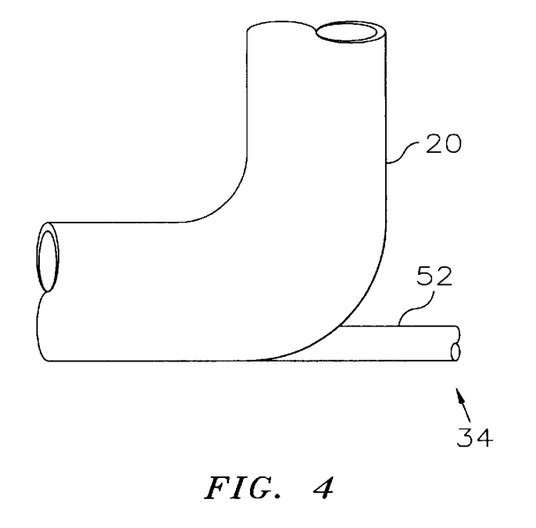
FIG. 4 is a cross section of a tangential location for the continuous take off assembly.

FIG. 4 shows a preferred attachment orientation for the take off cylinder 52 wherein it is affixed tangentially to the curvature of elbow 20 and at a point just prior to the slurry flow turning upward. This opening is elliptical to the inside surface. Further enlargement could be done to improve solids take off.

Figures 5, 6:
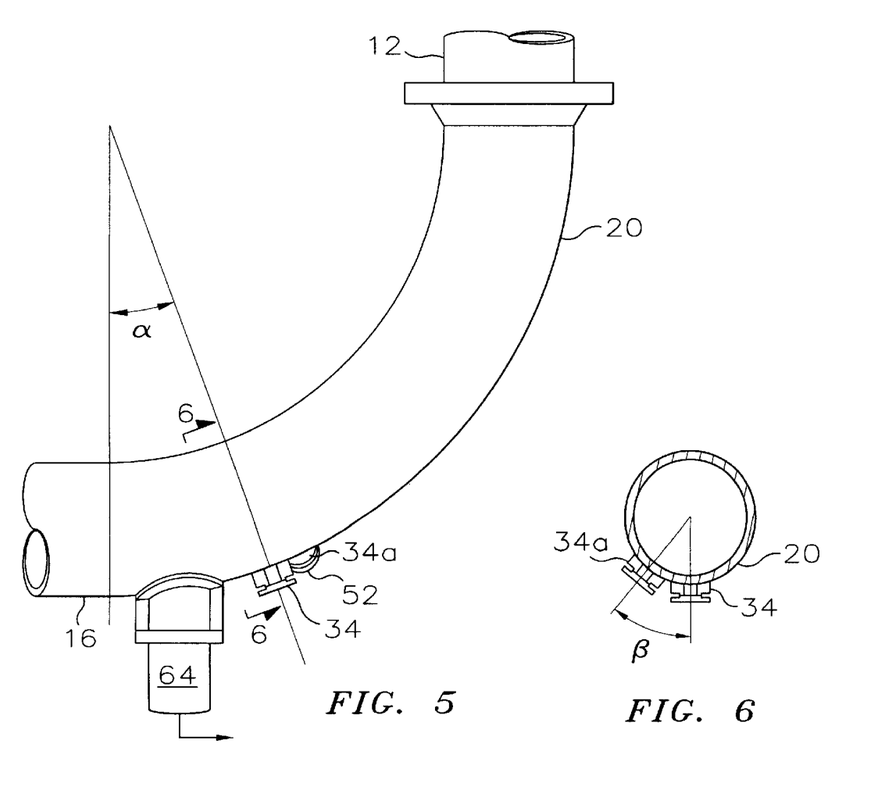
FIG. 5 is a side view of an elbow of the loop reactor showing both a settling let and continuous take off assemblies.
FIG. 6 is a cross section across line 6—6 of FIG. 5 showing the orientation of two of the continuous take off assemblies.

FIG. 5 shows four things. First, it shows an angled orientation of the take off cylinder 52. The take off cylinder is shown at an angle, alpha, to a plane that is (1) perpendicular to the centerline of the horizontal segment 16 and (2) located at the downstream end of the horizontal segment 16. The angle with this plane is taken in the downstream direction from the plane. The apex for the angle is the center point of the elbow radius as shown in FIG. 5. The plane can be described as the horizontal segment cross sectional plane. Here the angle depicted is about 24 degrees. Second, it shows a plurality of continuous take off appendages, 34 and 34a. Third, it shows one appendage, 34 oriented on a vertical center line plane of lower segment 16, and the other, 34a, located at an angle to such a plane as will be shown in more detail in FIG. 6. Finally, it shows the combination of continuous take off appendages 34 and a conventional settling leg 64 for batch removal, if desired.

In another embodiment of this invention, a polymerization process is provided. The process comprises: 1) polymerizing, in a loop reaction zone, at least one olefin monomer in a liquid diluent to produce a fluid slurry, wherein the fluid slurry comprises liquid diluent and solid olefin polymer particles; 2) withdrawing the fluid slurry comprising withdrawn liquid diluent and withdrawn solid polymer particles by alternately carrying out the following steps: a) allowing the fluid slurry to settle into at least one settling zone and thereafter withdrawing a batch of the thus settled slurry from the settling zone as an intermediate product of the process, thereafter shutting off the settling zone; and b) thereafter continuously withdrawing the fluid slurry comprising withdrawn liquid diluent and withdrawn solid polymer particles as an intermediate product of the process. In step b), the reactor conditions can be adjusted during startup to raise reactor solids by at least 10%.

As can be seen from the relative sizes, the continuous take off cylinders are much smaller than the conventional settling legs. Yet three 2-inch ID continuous take off appendages can remove as much product slurry as 14 8-inch ID settling legs. This is significant because with current large commercial loop reactors of 15,000–18000 gallon capacity, six eight inch settling legs are required. It is not desirable to increase the size of the settling legs because of the difficulty of making reliable valves for larger diameters. As noted previously, doubling the diameter of the pipe increases the volume four-fold and there simply in not enough room for four times as many settling legs to be easily positioned. Hence the invention makes feasible the operation of larger, more efficient reactors. Reactors of 30,000 gallons or greater are made possible by this invention. Generally the continuous take off cylinders will have a nominal internal diameter within the range of 1 inch to less than 8 inches. Preferably they will be about 2–3 inches internal diameter.

FIG. 6 is taken along section line 6—6 of FIG. 5 and shows take off cylinder 34a attached at a place that is oriented at an angle, beta, to a vertical plane containing the center line of the reactor. This plane can be referred to as the vertical center plane of the reactor. This angle can be taken from either side of the plane or from both sides if it is not zero. The apex of the angle is located at the reactor center line. The angle is contained in a plane perpendicular to the reactor center line as shown in FIG. 6.

It is noted that there are three orientation concepts here. First is the attachment orientation, i.e. tangential as in FIG. 4 and perpendicular as in FIG. 2 or 7 or any angle between these two limits of 0 and 90 degrees. Second is the orientation relative to how far up the curve of the elbow the attachment is as represented by angle alpha (FIG. 5). This can be anything from 0 to 60 degrees but is preferably 0 to 40 degrees, more preferably 0 to 20 degrees. Third is the angle, beta, from the center plane of the longitudinal segment (FIG. 6). This angle can be from 0 to 60 degrees, preferably 0 to 45 degrees, more preferably 0–20 degrees.

Figure 7:
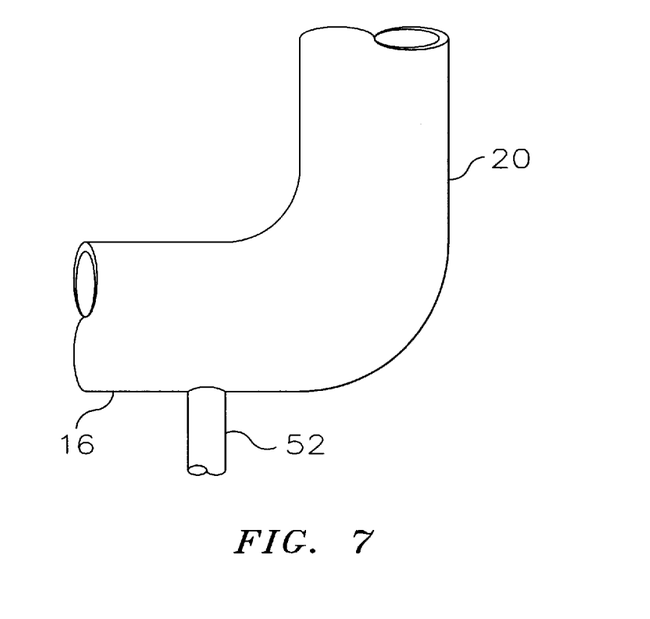
FIG. 7 is a side view showing another orientation for the continuous take off assembly.

FIG. 7 shows an embodiment where the continuous take off cylinder 52 has an attachment orientation of perpendicular, an alpha orientation of 0 (inherent since it is at the end, but still on, the straight section), and a beta orientation of 0, i.e. it is right on the vertical centerline plane of the lower horizontal segment 16.

Figure 8:
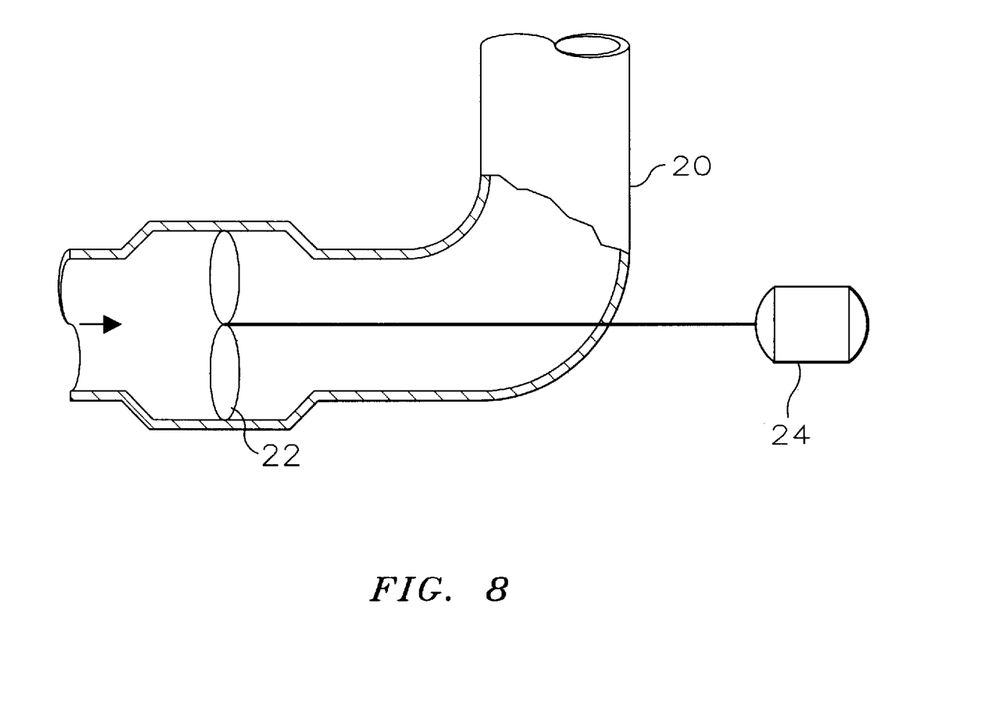
FIG. 8 is a cross sectional view of the impeller mechanism.

FIG. 8 shows in detail the impeller means 22 for continuously moving the slurry along its flow path. As can be seen in this embodiment the impeller is in a slightly enlarged section of pipe which serves as the propulsion zone for the circulating reactants. Preferably the system is operated so as to generate a pressure differential of at least 18 psig preferably at least 20 psig, more preferably at least 22 psig between the upstream and downstream ends of the propulsion zone in a nominal two foot diameter reactor with total flow path length of about 950 feet using isobutane to make predominantly ethylene polymers. As much as 50 psig or more is possible. This can be done by controlling the speed of rotation of the impeller, reducing the clearance between the impeller and the inside wall of the pump housing or by using a more aggressive impeller design as is known in the art. This higher pressure differential can also be produced by the use of at least one additional pump.

Generally the system is operated so as to generate a pressure differential, expressed as a loss of pressure per unit length of reactor, of at least 0.07, generally 0.07 to 0.15 foot slurry height pressure drop per foot of reactor length for a nominal 24 inch diameter reactor. Preferably, this pressure drop per unit length is 0.09 to 0.11 for a 24 inch diameter reactor. For larger diameters, a higher slurry velocity and a higher pressure drop per unit length of reactor is needed. This assumes the density of the slurry which generally is about 0.5–0.6.

Figure 9:
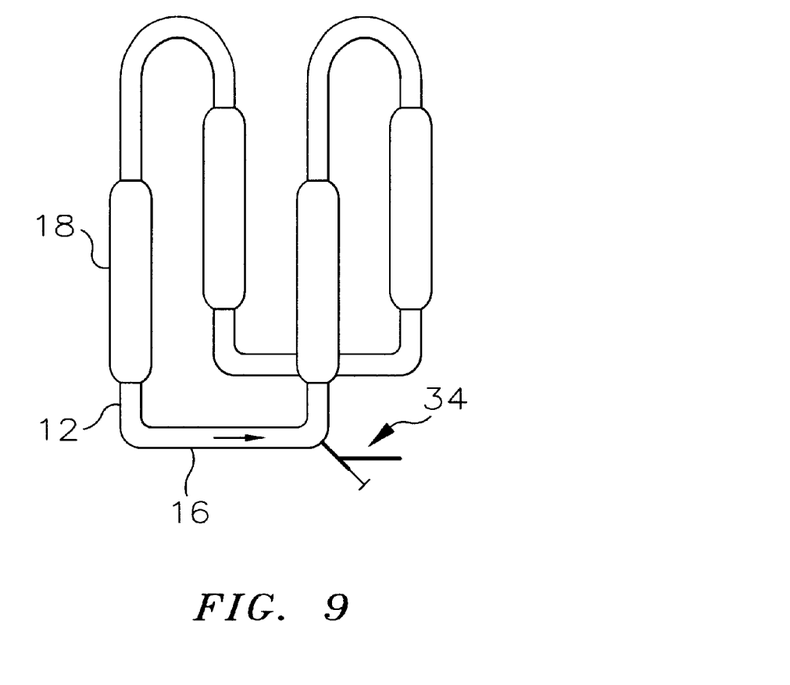
FIG. 9 is a schematic view showing another configuration for the loops wherein the upper segments 14a are 180 degree half circles and wherein the vertical segments are at least twice as long as the horizontal segments and FIG. 10 is a schematic view showing the longer axis disposed horizontally.
Figure 10:
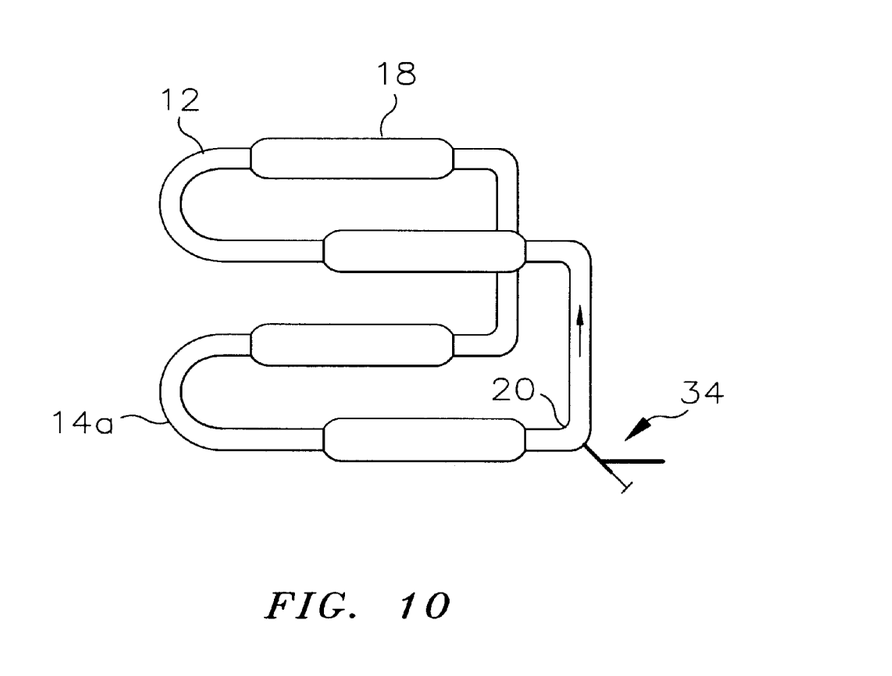

Referring now to FIG. 9 the upper segments are shown as 180 degree half circles which is the which is the preferred configuration. The vertical segments are at least twice the length, generally about seven to eight times the length of the horizontal segments. For instance, the vertical flow path can be 190–225 feet and the horizontal segments 25–30 feet in flow path length. Any number of loops can be employed in addition to the four depicted here and the eight depicted in FIG. 1, but generally four or six are used. Reference to nominal two foot diameter means an internal diameter of about 21.9 inches. Flow length is generally greater than 500 feet, generally greater than 900 feet, with about 940 to 1,350 feet being quite satisfactory.

Commercial pumps for utilities such as circulating the reactants in a closed loop reactor are routinely tested by their manufacturers and the necessary pressures to avoid cavitation are easily and routinely determined.

EXAMPLES

A four vertical leg polymerization reactor using a 26 inch Lawrence Pumps Inc. pump impeller D51795/81-281 in a M51879/FAB casing was used to polymerize ethylene and hexene-1. This pump was compared with a 24 inch pump which gave less aggressive circulation (0.66 ft of pressure drop vs 0.98). This was then compared with the same more aggressive circulation and a continuous take off assembly of the type shown by reference character 34 of FIG. 5. The results are shown below.

DATA TABLE

| Description | 24 in Pump | 26 in Pump | 26 in Pump + CTO |
|---|---|---|---|
| Date of Operation | Oct 4–9, 1994 | May 24–28, 1995 | Nov 15–18, 1996 |
| Avg. Reactor Solids Concentration, wt % | 39 | 45 | 53 |
| Polymer Production Rate, mlbs/hr | 40.1 | 40.7 | 39.9 |
| Reactor Circulation Pump Power, kw | 430 | 691 | 753 |
| Circulation Pump Pressure Diff, psi | 14.3 | 22.4 | 23.7 |
| Circulation Pump Head, ft | 61.8 | 92.5 | 92.4 |
| Reactor Slurry Flow Rate, mGPM | 39 | 46 | 45 |
| Reactor Slurry Density, gm/cc | 0.534 | 0.558 | 0.592 |
| Reactor Temperature, F. | 215.6 | 218.3 | 217.0 |
| Ethylene Concentration, wt % | 4.43 | 3.67 | 4.9 |
| Hexene-1 Concentration, wt % | 0.22 | 0.17 | 0.14 |
| Reactor Heat Transfer Coefficient | 270 | 262 | 241 |
| Reactor Inside Diameter, inches | 22.0625 | 22.0625 | 22.0625 |
| Reactor Volume, gal | 18700 | 18700 | 18700 |
| Reactor Length, ft | 941 | 941 | 941 |
| Pressure Drop per Foot of Reactor, ft/ft | 0.066 | 0.098 | 0.098 |

While this invention has been described in detail for the purpose of illustration, it is not to be construed as limited thereby, but is intended to cover all changes within the spirit and scope thereof.

That which is claimed is:

1. A polymerization process comprising:
   polymerizing, in a loop reaction zone, at least one olefin monomer in a liquid diluent to produce a fluid slurry comprising liquid diluent and solid olefin polymer particles;
   maintaining a concentration of solid olefin polymer particles in said slurry in said zone of greater than 40 weight percent based on the weight of said polymer particles and the weight of said liquid diluent;
   continuously withdrawing said slurry comprising withdrawn liquid diluent and withdrawn solid polymer particles, as an intermediate product of said process.

2. A process according to claim 1 wherein said olefin monomer comprises ethylene.

3. A process according to claim 1 wherein said olefin monomer comprises ethylene and 0.01–5 weight percent hexene based on the total weight of said ethylene and said hexene, and wherein said liquid diluent is isobutane.

4. A process according to claim 3 wherein said concentration of said solid olefin polymer particles in said slurry in said zone is greater than 50 weight percent based on the weight of said polymer particles and the weight of said liquid diluent.

5. A process according to claim 1 wherein a pressure differential of at least 18 psig is maintained in a propulsion zone to circulate said slurry through said reaction zone.

6. A process according to claim 1 wherein a pressure differential of greater than 0.07 foot slurry height pressure drop per foot of reactor flow path length is maintained in a propulsion zone.

7. A process according to claim 6 wherein said pressure differential is within the range of 0.07 to 0.15 foot slurry height pressure drop per foot of reactor flow path length.

8. A process according to claim 1 wherein said reaction zone is maintained liquid full.

9. A process according to claim 1 wherein said reaction zone has a volume of greater than 20,000 gallons.

10. A process according to claim 1 wherein said reaction zone has a volume of greater than 30,000 gallons.

11. A process according to claim 1 wherein said intermediate product of said process is continuously passed through a heating zone wherein said intermediate product is heated to produce a heated intermediate product and thereafter said heated intermediate product is exposed to a pressure drop in a high pressure flash zone, said heated intermediate product being heated to an extent such that a major portion of said withdrawn liquid diluent is vaporized and thus separated from said withdrawn solid polymer particles, the thus separated withdrawn liquid diluent thereafter being condensed for recycle, without any compression, by heat exchange with a fluid having a temperature within the range of about 40 degrees F to about 130 degrees F.

12. A process according to claim 1 wherein said slurry is continuously withdrawn from an area near the last point in said loop reaction zone where flow turns upward before a catalyst introduction zone.

13. A process according to claim 1 wherein said slurry is continuously withdrawn from at least one area adjacent the end of a lower zone of horizontal flow.

14. A process according to claim 13 wherein said slurry is withdrawn at a point along the vertical centerline plane of said lower zone of horizontal flow and prior to said flow turning upward.

15. A process according to claim 13 wherein said at least one area is along the vertical centerline plane of said lower zone of horizontal flow and after said flow has turned upward.

16. A process according to claim 13 wherein said at least one area is oriented at an angle away from the vertical center plane of said lower zone of horizontal flow an amount within the range of 0 degrees to 45 degrees.

17. A process according to claim 16 wherein said at least one area is oriented away from said vertical center plane at an angle within the range of 0 degrees to 20 degrees.

18. A process according to claim 16 wherein said at least one area is prior to said flow turning upward.

19. A process according to claim 16 wherein said at least one area is at a location after said flow has turned upward at least 1 but less than 45 degrees from a centerline of upward flow.

20. A process according to claim 13 wherein said at least one area is exactly one area.

21. A process according to claim 13 wherein said at least one area is a plurality of areas.

22. A polymerization process comprising:

polymerizing, in a loop reaction zone, at least one olefin monomer in a liquid diluent to produce a fluid slurry comprising liquid diluent and solid olefin polymer particles wherein the concentration of the solid olefin polymer particles is greater than 40 weight percent;

withdrawing said fluid slurry comprising withdrawn liquid diluent and withdrawn solid polymer particles by alternately carrying out the following steps:

(A) allowing said fluid slurry to settle into at least one settling zone and thereafter withdrawing a batch of the thus settled slurry from said settling zone as an intermediate product of said process, thereafter shutting off said settling zone; and (B) thereafter continuously withdrawing said fluid slurry in said loop reaction zone comprising withdrawn liquid diluent and withdrawn solid polymer particles as an intermediate product of said process.

23. A process according to claim 22 comprising in addition adjusting reactor conditions during startup of step (B) to raise reactor solids by at least 10 percent.

24. A polymerization process comprising:

polymerizing, in a loop reaction zone, at least one olefin monomer using a catalyst comprising chromium oxide on a support in a liquid diluent to produce a fluid slurry comprising liquid diluent and solid olefin polymer particles;

maintaining a concentration of said solid olefin polymer particles in said slurry in said zone of greater than 40 weight percent based on the weight of said polymer particles and the weight of said liquid diluent;

continuously withdrawing slurry comprising withdrawn liquid diluent and withdrawn solid polymer particles as an intermediate product of said process.

25. A polymerization process comprising:

polymerizing, in a loop reaction zone, at least one olefin monomer in a liquid diluent to produce a fluid slurry comprising liquid diluent and solid olefin polymer particles;

circulating said fluid slurry through said loop reaction zone, thus stratifying said fluid slurry wherein the concentration of the solid olefin polymer particles is greater than 40 weight percent;

continuously withdrawing a slurry from a stratum where said solids are more concentrated, the thus withdrawn slurry thus having an increase in solid concentration as compared with said fluid slurry circulating in said zone, said thus withdrawn slurry comprising withdrawn liquid diluent and withdrawn solid polymer particles, as an intermediate product of said process.

* * * * *